(12) United States Patent
Liao et al.

(10) Patent No.: US 8,142,041 B2
(45) Date of Patent: Mar. 27, 2012

(54) LENTICULAR FILM AND BACKLIGHT MODULES FOR USE THEREWITH

(75) Inventors: Weijun Liao, Shanghai (CN); Philip M. Peters, Mount Vernon, IN (US)

(73) Assignee: Sabic Innovative Plastics IP B.V. (NL)

( * ) Notice: Subject to any disclaimer, the term of this patent is extended or adjusted under 35 U.S.C. 154(b) by 290 days.

(21) Appl. No.: 12/549,201

(22) Filed: Aug. 27, 2009

(65) Prior Publication Data

US 2011/0051396 A1 Mar. 3, 2011

(51) Int. Cl.
F21S 8/10 (2006.01)
G09F 13/04 (2006.01)

(52) U.S. Cl. ...... 362/97.1; 362/97.2; 362/241; 362/242; 362/243; 362/246

(58) Field of Classification Search ........ 362/97.1–97.4, 362/241, 242, 243, 246
See application file for complete search history.

(56) References Cited

U.S. PATENT DOCUMENTS

| | | | |
|---|---|---|---|
| 5,592,332 A | 1/1997 | Nishio et al. | |
| 5,598,280 A | 1/1997 | Nishio et al. | |
| 5,870,224 A | 2/1999 | Saitoh et al. | |
| 5,885,490 A | 3/1999 | Kawaguchi et al. | |
| 5,971,559 A | 10/1999 | Ishikawa et al. | |
| 6,169,633 B1 | 1/2001 | Watanabe | |
| 7,092,163 B2 | 8/2006 | Bastawros et al. | |
| 7,213,933 B2 | 5/2007 | Chang et al. | |
| 7,213,936 B2 | 5/2007 | Wang et al. | |
| 7,391,571 B2 | 6/2008 | Lee et al. | |
| 7,408,708 B2 | 8/2008 | Goto et al. | |
| 7,556,393 B2 | 7/2009 | Onishi et al. | |
| 2003/0086030 A1 | 5/2003 | Taniguchi et al. | |
| 2003/0169504 A1 | 9/2003 | Kaminsky et al. | |
| 2004/0027672 A1 | 2/2004 | Bourdelais et al. | |
| 2005/0248848 A1 | 11/2005 | Whitehead et al. | |
| 2006/0002675 A1 | 1/2006 | Choi et al. | |
| 2006/0145374 A1 | 7/2006 | Baba et al. | |
| 2006/0182409 A1 | 8/2006 | Sudol | |
| 2006/0256580 A1 | 11/2006 | Kang et al. | |
| 2006/0262555 A1 | 11/2006 | Yi et al. | |
| 2006/0274244 A1 | 12/2006 | Battiato et al. | |
| 2007/0002583 A1 | 1/2007 | Lee et al. | |
| 2007/0159699 A1 | 7/2007 | Wang et al. | |
| 2007/0236940 A1 | 10/2007 | Kuroda et al. | |
| 2007/0242479 A1 | 10/2007 | Ohta et al. | |
| 2007/0263292 A1 | 11/2007 | Ha et al. | |

(Continued)

FOREIGN PATENT DOCUMENTS

| | | |
|---|---|---|
| EP | 1767962 A1 | 3/2007 |
| JP | 2007133196 A | 5/2007 |
| JP | 2007179035 A | 7/2007 |
| WO | 2009102951 A1 | 8/2009 |

OTHER PUBLICATIONS

Japanese Patent No. 2007133196A; Publication Date: May 31, 2007; Abstract Only; 1 Page.

(Continued)

*Primary Examiner* — Stephen F Husar
*Assistant Examiner* — James Cranson, Jr.
(74) *Attorney, Agent, or Firm* — Cantor Colburn LLP

(57) ABSTRACT

A backlight module can comprise: a backlight source, a diffuser plate adjacent the backlight source, and a lenticular film having a convex lenticular feature on a viewing side, wherein the diffuser plate is located between the lenticular film and the backlight source.

21 Claims, 7 Drawing Sheets

U.S. PATENT DOCUMENTS

| | | | |
|---|---|---|---|
| 2008/0100058 A1 | 5/2008 | Klotten et al. | |
| 2008/0111948 A1 | 5/2008 | Epstein et al. | |
| 2008/0186738 A1 | 8/2008 | Kim et al. | |
| 2008/0192484 A1 | 8/2008 | Lee et al. | |
| 2008/0231780 A1* | 9/2008 | Graf et al. | 349/112 |
| 2008/0232132 A1 | 9/2008 | Graf et al. | |
| 2008/0291361 A1 | 11/2008 | Weber | |
| 2009/0059124 A1 | 3/2009 | Kim | |
| 2009/0161385 A1 | 6/2009 | Parker et al. | |
| 2009/0219461 A1 | 9/2009 | Zhou et al. | |

OTHER PUBLICATIONS

Japanese Patent No. 2007179035A; Publication Date: Jul. 12, 2007; Abstract Only; 1 Page.

Japanese Patent No. 2008044136A; Publication Date: Feb. 28, 2008; Abstract Only; 1 Page.

Japanese Patent No. 4275502A; Publication Date: Oct. 1, 1992; Abstract Only; 1 Page.

Flat Panel Display Measurements Standard, Version 2.0; Video Electronics Standards Association, Display Metrology Committee; Jun. 1, 2001; 2 Pages.

International Search Report; International Application No. PCT/US2010/046895: International Filing Date: Aug. 27, 2010; Date of Mailing: Dec. 3, 2010; 5 Pages.

Written Opinion of the International Searching Authority; International Application No. PCT/US2010/046895; International Filing Date: Aug. 27, 2010; Date of Mailing: Dec. 3, 2010; 8 Pages.

* cited by examiner

LENTICULAR FILM AND BACKLIGHT MODULES FOR USE THEREWITH

BACKGROUND

This disclosure generally relates to diffuser films and especially to diffuser films and backlight displays using the diffuser film.

In many backlight display devices, for example in liquid crystal display televisions (LCD TV), to save the space and lower the power consumption, the market is experiencing an Eco and slim trend. Although there is a demand for larger displays (viewing area), the device is thinner and the spacing between bulbs has increased. Thinner devices with greater spacing between lamps makes it more difficult to hide the individual lamps as the light from individual lamps has less space (distance between the lamp and the surface of the device) to be mixed uniformly. Generally, there are greater than or equal to 6 bulbs per 10 centimeter (cm), with an overall device thickness of greater than or equal to about 20 millimeters (mm) having a diffuser plate thickness of greater than or equal to 1.5 mm.

Accordingly, a continual need exists in the art for improved light diffusing devices, especially those light diffusing films employed in LCD TVs.

BRIEF DESCRIPTION

Disclosed herein are lenticular films, backlight modules using lenticular films, and methods for making the same.

In one embodiment a backlight module can comprise: a backlight source, a diffuser plate adjacent the backlight source, and a lenticular film having a convex surface feature on a viewing side, wherein the diffuser plate is located between the lenticular film and the backlight source. The backlight module can have a distance "a" between the backlight sources and the diffuser plate, and has a distance "b" between adjacent backlight sources, and has an AB ratio of "a" divided by "b".

In one embodiment, a lenticular film can comprise: convex, lenticular structures on the viewing side of the film, wherein the film has an aspect ratio of greater than or equal to 0.4.

The above described and other features are exemplified by the following figures and detailed description.

BRIEF DESCRIPTION OF THE DRAWINGS

Refer now to the figures, which are exemplary, not limiting, and wherein like numbers are numbered alike.

FIG. 2 is a schematic illustration of viewing side of a backlight module having a thickness (i.e., distance between the reflector and the diffuser plate) of 20 mm, and an AB ratio of 0.57, and with the lights turned on.

FIG. 3 is a schematic illustration of viewing side of a backlight module having a thickness of 20 mm, and an AB ratio of 0.27, and with the lights turned on.

DETAILED DESCRIPTION

When decreasing the thickness of the film stack and/or increasing the spacing between light sources (e.g., cold cathode fluorescent lamp (CCFL)) in a backlight display module, hiding power and luminance become issues. The hiding power is the ability to "hide" the individual lamps from view on the viewing side of the backlight module (e.g., to uniformly distribute the light from the light sources).

Figure 2:
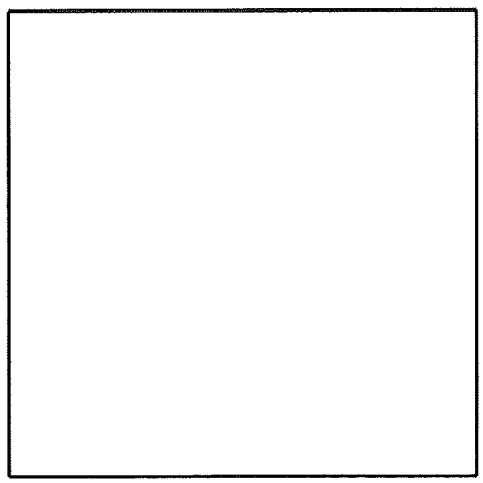
Figure 3:
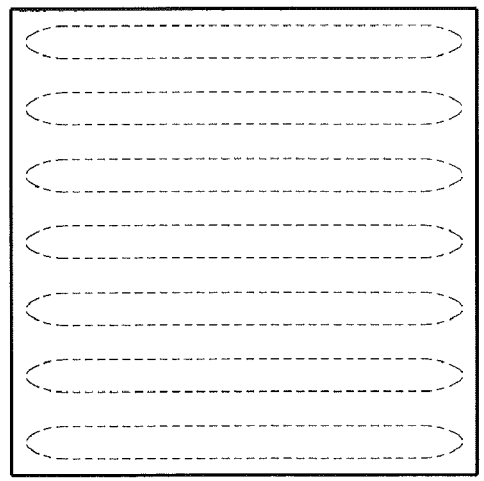
Figure 9:
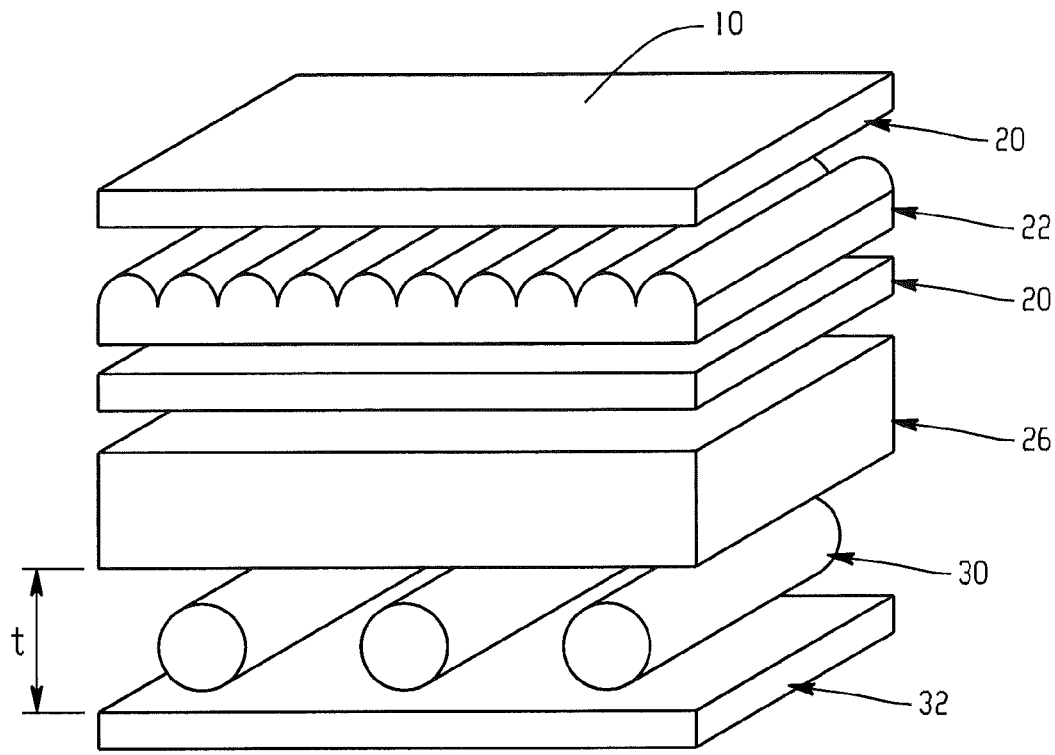
FIGS. 9-12 are exemplary embodiments of film stacks comprising lenticular film(s), diffuser plate(s), non-lenticular diffuser film(s), collimating film(s), a reflector, and/or light source(s) in various configurations and orientations.
Figure 10:
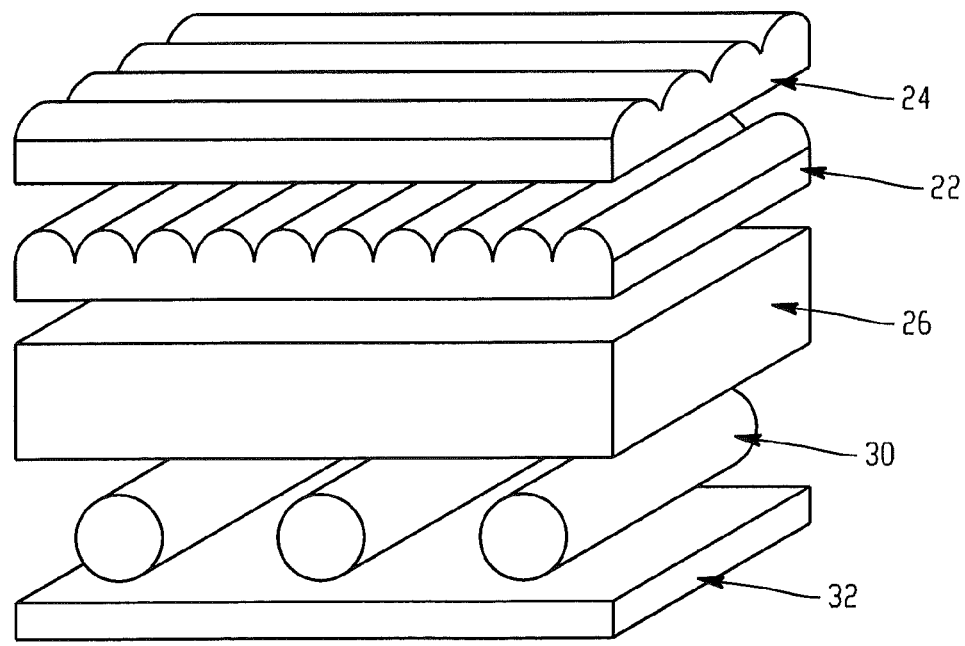
Figure 11:
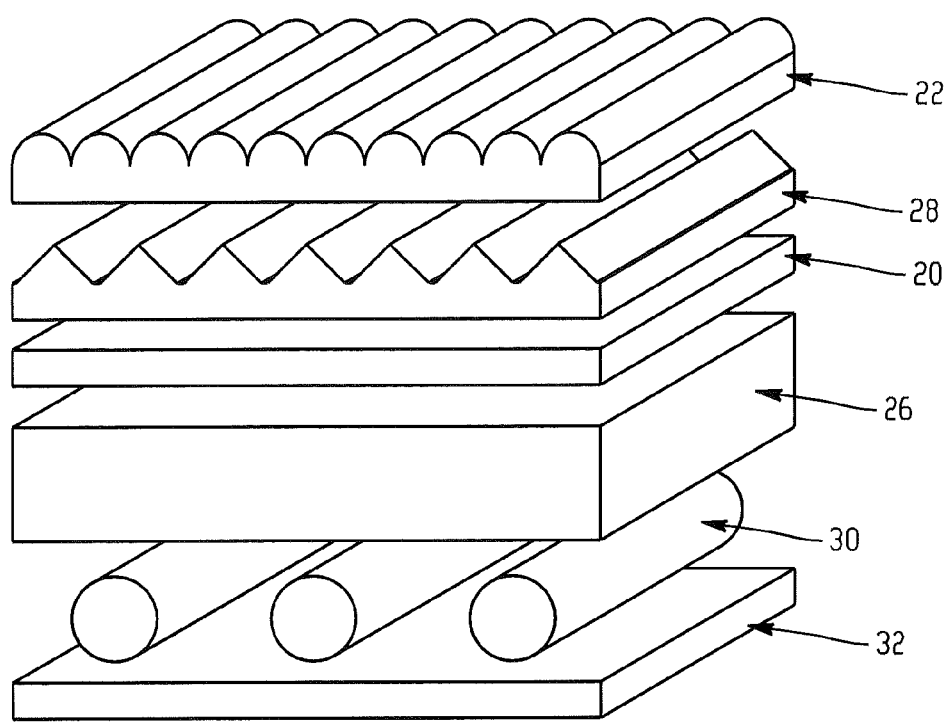
Figure 12:
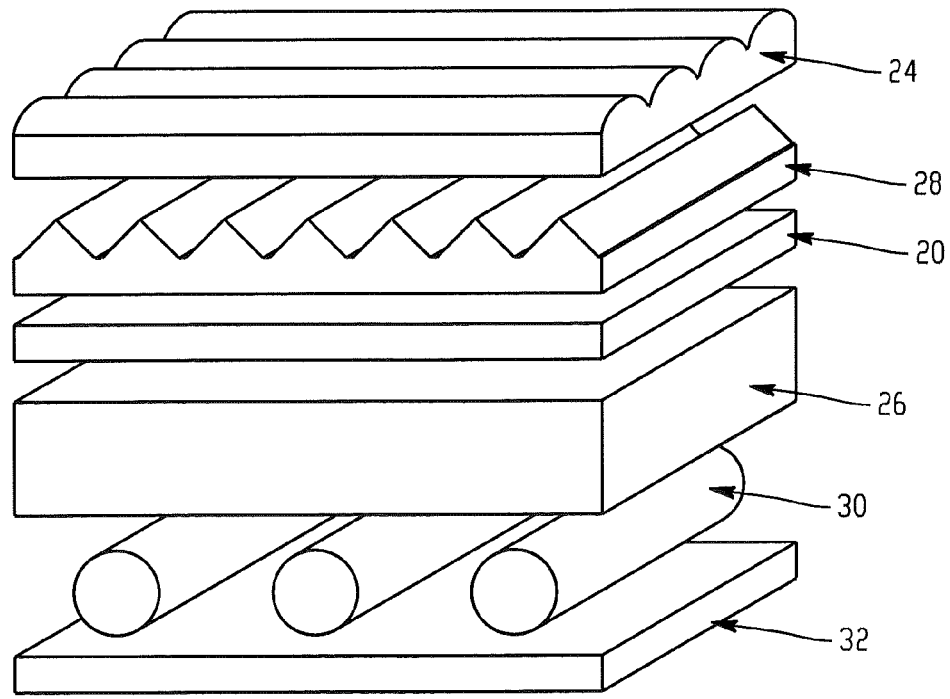

In a backlight module (BLM) system, "Eco" will decrease the number of lamps by 25%, 50%, and even more (e.g., from 16 bulbs to 8 bulbs), to reduce the power consumption, thereby saving energy. "Slim" uses a reflector to diffuser plate thickness much thinner than the standard application. For instance, the standard TV BLM thickness ("t", see FIG. 9; i.e., the distance from the reflector to the diffuser plate) is 20 millimeters (mm), but the slim TV BLM thickness could be less than or equal to 10 mm. FIGS. 2 and 3 illustrate the visual effect of a plate/film stack placed in standard BLM and slim BLM, respectively. In this example, given the same lamp spacing (see "b" in FIG. 4) of 24 mm, the standard backlight module has a thickness "t" of 20 mm and has very uniform visual effect (FIG. 2). No lamps can be seen. In FIG. 3, where the slim backlight module with thickness "t" of 10 mm, the lamp image can be seen through the surface of the film as is illustrated by the faint, dashed lines.

Hiding power performance can be addressed in several fashions, including adding more films. However, when overall thickness is limited, this option is not feasible. Another option is texture and scattering particles. Although scattering particles may improve the hiding power to some extent, the improvement is limited and the improvement in hiding power is at the expense of luminance (i.e., luminance will drop if scattering particles are added to the film).

In optical performance, luminance is a parameter used to measure the backlight module performance. Luminance refers to the on-axis (directly above the plate/film surface) and off-axis light traveling to the viewer and can be measured with a standard test system (Microvision SS300 commercially available from Microvision Corporation, 11802 Kemper Rd. Auburn, Calif. 95603). Normally, on-axis is defined as 0 degree and the off-axis is measured from −70 to 70 degrees.

Figure 1:
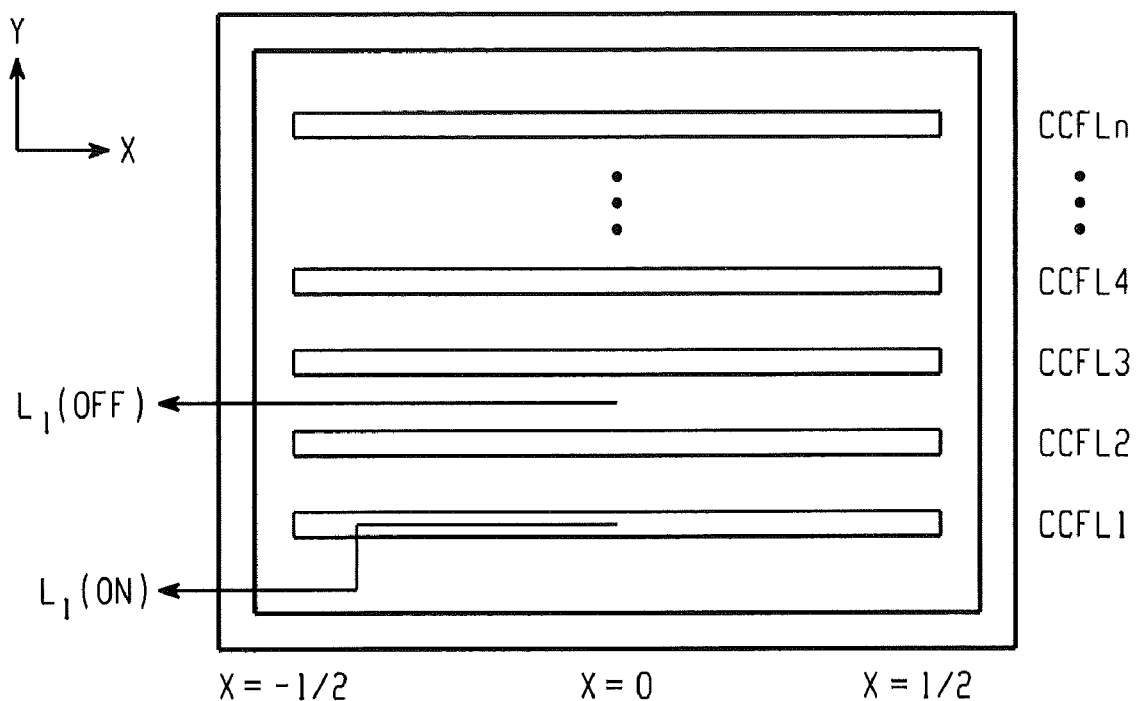
FIG. 1 is a cross sectional view of a linear array of cold cathode fluorescent lamps (CCFLs).

Another parameter for optical performance of a backlight module is hiding power. FIG. 1 is an illustration of a linear array of lamps, e.g., cold cathode fluorescent lamps (CCFL1, CCFL2 ... CCFLn) in direct-lit backlight module. The "hiding power" refers to the ability of light diffusing plates/films to hide the individual lamps. Poor hiding power performance will allow the viewer to easily see the bright and dark lines produced by the lamp series. Quantitatively, hiding power can be mathematically described with Equation I:

$$\text{Hiding power (\%)} = \left(1 - \frac{\sum_{i=1}^{n-1} L_i \text{ (on)}}{\sum_{j=1}^{n-1} L_j \text{ (off)}}\right) \times 100,$$

where $L_i(\text{on})$ is the luminance directly above one of the lamps, and $L_j(\text{off})$ is the luminance directly above a midpoint between lamp j and lamp j+1, and n is the number of lamps. As light has a more direct path to the point directly above a lamp, generally $L_j(\text{off})$ will be smaller than $L_i(\text{on})$. If the luminance is very uniform and $L_i(\text{on})$ is equal to $L_j(\text{off})$, the hiding power will be perfect, or 0%. Otherwise, it will typically be negative. In some cases, the hiding power will be positive after the backlight is covered with plates/films. In reality the value of importance for the hiding power is its absolute value, wherein a lower value reflects better hiding power.

Figure 4:
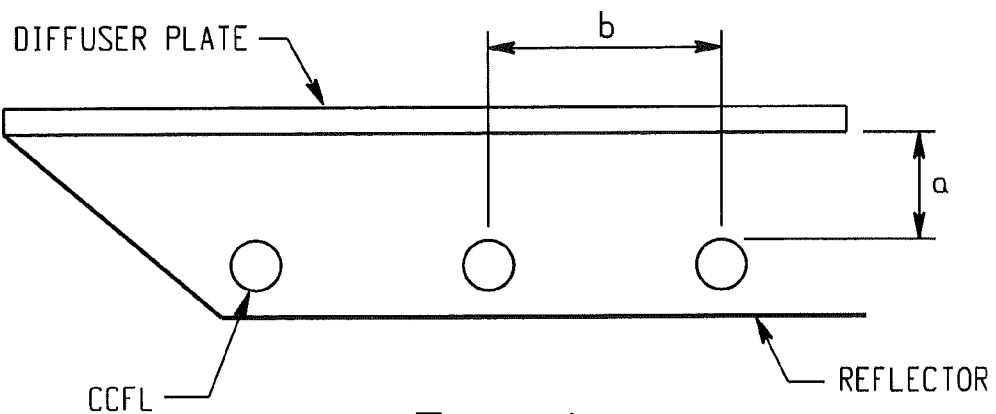
FIG. 4 is an embodiment of a structure of a backlight module illustrating the determination of the spacing "b" between the light sources, and the distance "a" between the light source and the diffuser plate.

The hiding power varies with different backlight module designs. FIG. 4 gives the structure of a direct-lit backlight module. The distance "a" is the distance between the top of a lamp and the bottom of a diffuser plate, and "b" is the space between two adjacent lamps. AB ratio is defined as "a" divided by "b" (a/b), and the value of the AB ratio determines the hiding power performance of the backlight module. A standard backlight module has an AB ratio of greater than 0.5 (e.g., 0.7), whereas a slim backlight module has an AB ratio of less than or equal to 0.5, specifically, less than or equal to 0.4, e.g., for example 0.15 to 0.4, specifically, 0.15 to 0.3. As the AB ratio decreases, the hiding power gets worse for a given backlight module configuration.

Figure 5:
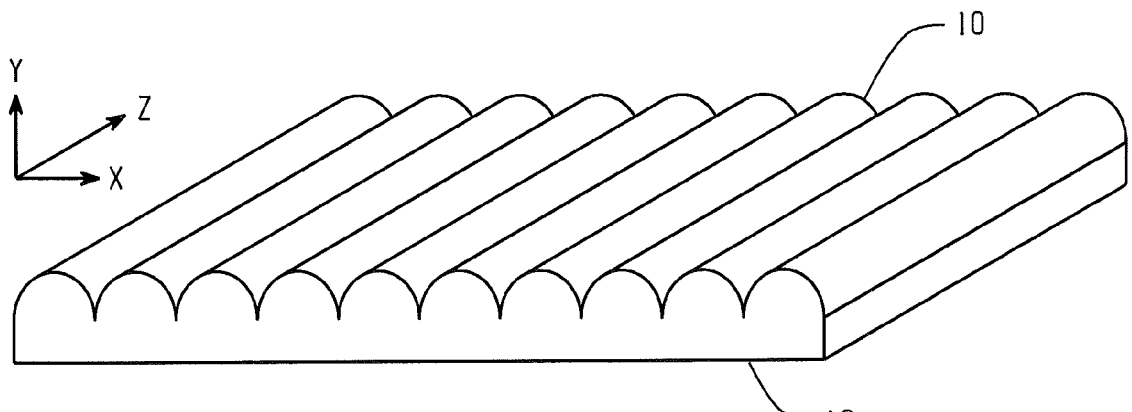
FIG. 5 is one embodiment of a lenticular texture on a diffuser film with the lenticular texture on the viewing surface of the film and a smooth (e.g., polish) surface on the non-viewing surface of the film.
Figure 6:
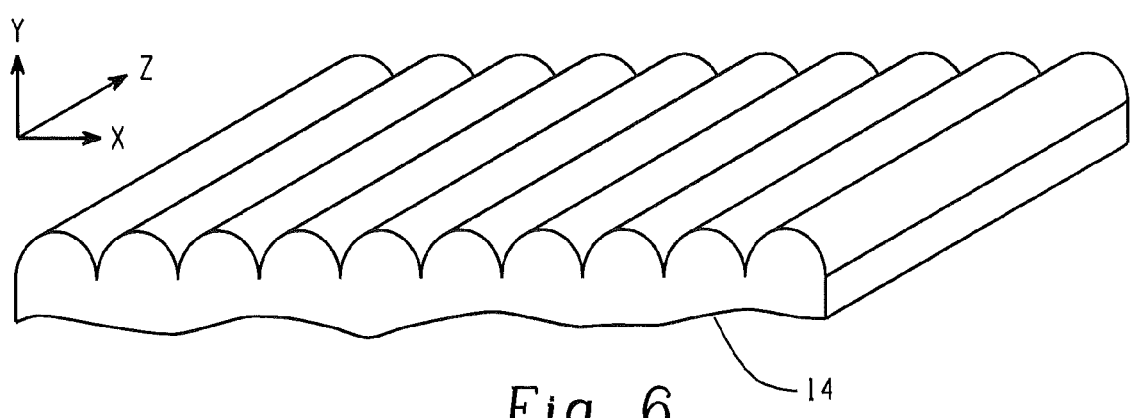
FIG. 6 is yet another embodiment of a lenticular texture on a diffuser film with the lenticular texture on the viewing side of the film and a random rough texture (e.g., matte finish) on the non-viewing side of the film.

It has been discovered that a film with a lenticular texture on the top surface (i.e., on the viewing side), provides a high capability to hide the lamps and at the same time provides good optical luminance performance. FIGS. 5 and 6 are exemplary embodiments of lenticular films. As can be seen from the figures, lenticular films have, on the viewing side "10", a convex surface feature (e.g., a cross-sectional shape ranging from a cropped circle, (e.g., semi-circular), to a cropped ellipse (e.g., a semi-ellipse) that extends along the film, e.g., in the "z" direction (e.g., there are not separate distinct features in the "z" direction). The opposite side of the film, the non-viewing side, can have a polished surface (non-viewing side 12), or a matte finish (non-viewing side 14). As used herein, a matte finish is intended to refer to a roughened surface, e.g., a surface that has structures with a random size and shape (i.e., the size and shape do not repeat on regular intervals), wherein surface features (e.g., prisms, microlenses, cube corners, etc.) have a fixed shape and are periodic in that they repeat at regular intervals).

Figure 7:
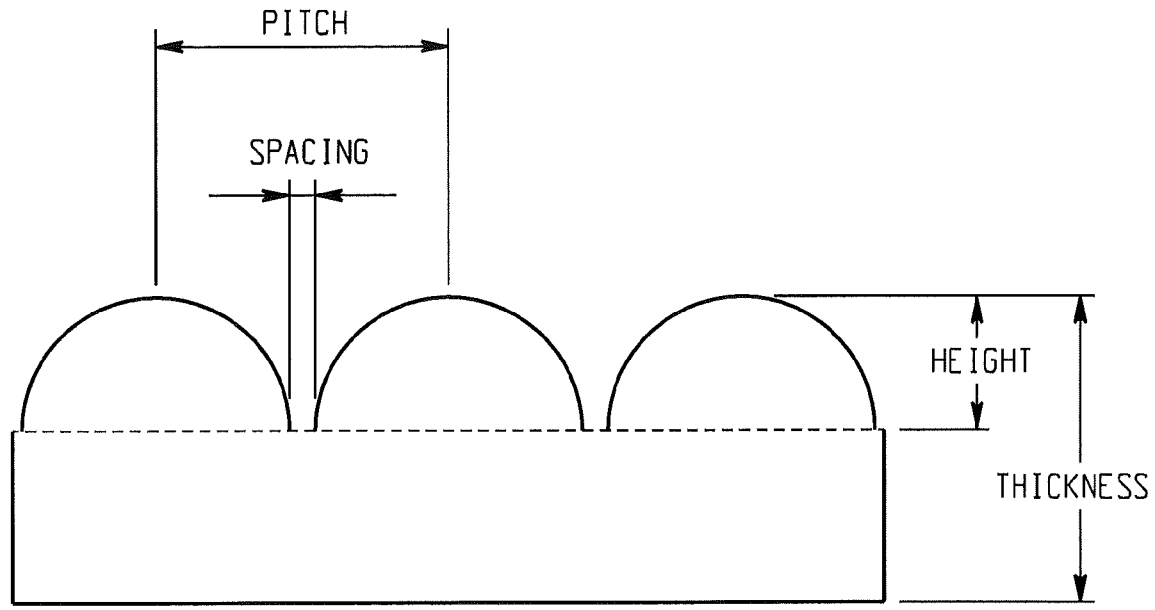
FIG. 7 is a cross-sectional view of another embodiment of a lenticular texture on a diffuser film.
Figure 8:
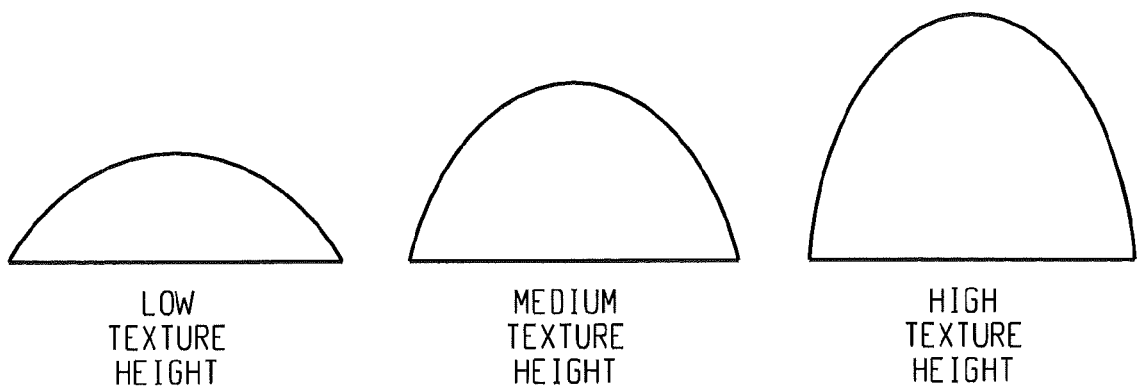
FIG. 8 illustrates exemplary lenticular textures ranging from low texture height to high texture height, wherein the texture evolves to ellipsoidal.

Lenticular features are further illustrated in FIGS. 7 and 8. The lenticular feature can have a height of 1 micrometers to 1 mm, specifically 10 micrometers to 200 micrometers, and more specifically, 20 micrometers to 100 micrometers. The pitch can be 1 micrometers to 1 mm, specifically 20 micrometers to 500 micrometers, and more specifically, 30 micrometers to 200 micrometers. The film thickness can be 0.01 mm to 1 mm, specifically 0.1 mm to 0.5 mm, and more specifically, 0.2 mm to 0.4 mm, while the feature spacing (between adjacent features) can be 0 to 10 micrometers, specifically 0 to 5 micrometers, and more specifically, 0 to 2 micrometers. The aspect ratio (i.e., the height divided by the pitch), can be greater than or equal to 0.4, specifically, greater than or equal to 0.45, and more specifically, 0.5 to 0.7.

As set forth in FIGS. 9-12, a backlight module can comprise many various configurations using the lenticular film(s). The backlight module can comprise: light sources (e.g., bulbs) 30, reflector 32, diffuser plate 26, and horizontal lenticular film(s) 22 and/or vertical lenticular film(s) 24. Optionally, the backlight module can further comprise: diffuser film(s), prism film(s), and/or polarizing film(s). The diffusing film(s) and/or prism film(s) can be located between the diffusing plate 26 and any lenticular film, between lenticular films, and/or on the viewing side of all lenticular films. Additionally, the orientation of the lenticular film(s) can be parallel or perpendicular to that of the prism film(s).

The diffuser plate, lenticular film(s), diffuser film(s), and prism film(s), can comprise the same or different optically transparent polymeric material(s). These materials could include polyalkylenes, polycarbonates (PC), cycloolefin polymer, polyesters (e.g., polyethylene terephthalate (PET)), poly(meth)acrylates (i.e., polyacrylates, polymethacrylates, polyalkyl(meth)acrylates (such as polymethylmethacrylate (PMMA))), polypropylene, acrylonitrile-butadiene-styrene, polystyrene, styrene acrylonitrile copolymer, polyetherimides (PEI), polyethylene, polyvinyl chlorides, and combinations comprising at least one of the foregoing. For example, the material can be acrylonitrile-butadiene-styrene/nylon, polycarbonate/acrylonitrile-butadiene-styrene, acrylonitrile butadiene styrene/polyvinyl chloride, polycarbonate/thermoplastic urethane, polycarbonate/polyethylene terephthalate, polycarbonate/polybutylene terephthalate, polyester/elastomers, polyethylene terephthalate/polybutylene terephthalate, styrene-maleic anhydride/acrylonitrile-butadiene-styrene, polyether, as well as combinations comprising at least one of the foregoing polymers. The diffuser plate, lenticular film(s), diffuser film(s), and prism film(s), can further include various additives so long as those additives do not have a substantial adverse affect on the desired properties, such as greater than 10% light absorption and/or greater than 20% luminance drop. Possible additives include impact modifiers, fillers, stabilizers (e.g., heat stabilizers, light stabilizers, and so forth), antioxidants, mold release agents, lubricants, flame retardants, anti-drip agents, optical brighteners, and combinations of the foregoing. The additives can be present in an amount effective to impart the desired effect. For example, the additive can be present in an amount of 0.001 weight percent (wt %) to 10 wt %, based on a total weight of the particular film, and dependent upon any adverse effect caused by the additive.

The diffuser film and diffuser plate diffuse light. Specifically, the diffuser plate is the first device that will transmit light from the lamp to the viewer side and the diffuser film will be arranged after the diffuser plate (e.g., on the viewer side of the diffuser plate). The diffuser plate has a thickness of greater than or equal to 1 mm, while the diffuser film has a thickness of less than 1 mm, specifically, less than or equal to 0.5 mm. As used herein, the terms "diffuse" or "diffusing" are intended to include light scattering or diffusion by reflection, refraction or diffraction (e.g., from surface textures and/or particles, and so forth). For example, a diffuser plate and diffuser film have a stronger diffusing capability than collimating capability, while a collimating film has a stronger collimation capability than diffusing capability. Diffusing particles can be integrally mixed into the material for the diffuser plate and/or film during processing. Some possible light diffusing particles include, but are not limited to, titanium dioxide ($TiO_2$), poly(meth)acrylates, polystyrene, cross-linked siloxane (e.g., Tospearl particles commercially available from Momentive Performance Materials), as well as combinations comprising at least one of the foregoing. Possible light diffusing textures include one or both sides of the diffuser plate and/or film matte finish.

Additional optional films that can be employed in the various embodiments include prism film(s) and polarizing film(s). The prism film(s) provides a high light collimation capability to give high luminance performance. The prism film(s) can include a polymer base with a coating layer having prismatic texture or a monolithic polymer having prismatic texture in one side. The polymer can include, for example, polyalkylenes, polycarbonates (PC), cycloolefin polymer, polyesters, polyethylene terephthalate (PET), poly(meth)acrylates, styrene acrylonitrile copolymer, (e.g., acrylonitrile-butadiene-styrene), polypropylene, polystyrene, polyetherimides (PEI), polyethylene, polyvinyl chlorides, and a copolymer thereof. The coating layer(s) can include, for example, acrylates, such as epoxy acrylates, polyester acrylates, acrylic acrylates, polyether acrylates, urethane acrylates, fluorinated acrylates, and combinations of the foregoing acrylates. Such coating layer(s) can be cured thermally, or with ultraviolet (UV) and/or electron beam (EB) energy. For example, an exemplary UV-curable coating layer 208 can comprise, among other materials, a monomeric (meth)acrylate, oligomeric (meth)acrylate, and a photoinitiator. The polarizing film (e.g. dual brightness enhancing film ("DBEF"), is commercially available from 3M Company) provides a polarizing light recycling capability that further improves the luminance transmitting to the panel.

The other elements of the backlight module, e.g., the light source(s), reflector, and liquid crystal display, can be any that will function under the desired conditions, while minimizing heat dissipation issues. For example, the light source(s) can be cold cathode fluorescent lamp(s) and/or light emitting diode(s) (LED). The reflector can be any reflective material that can reflect the light from the light source(s) back toward the film stack. Possible materials include aluminum, glass, as well as combinations comprising at least one of the foregoing; e.g., prismatic glass, micro-glass, and nano-particles.

While the backlight modules (e.g., display film stacks) as disclosed herein are particularly suited for use in liquid crystal display systems (LCDs), it is to be understood that any reference to LCDs is made merely for ease in discussion and it is to be understood that other devices and applications are envisioned to be within the scope of this disclosure. For example, the backlight modules can be employed in any display device, such as LCD televisions, laptop computers, instrument displays, and the like.

Figure 13:
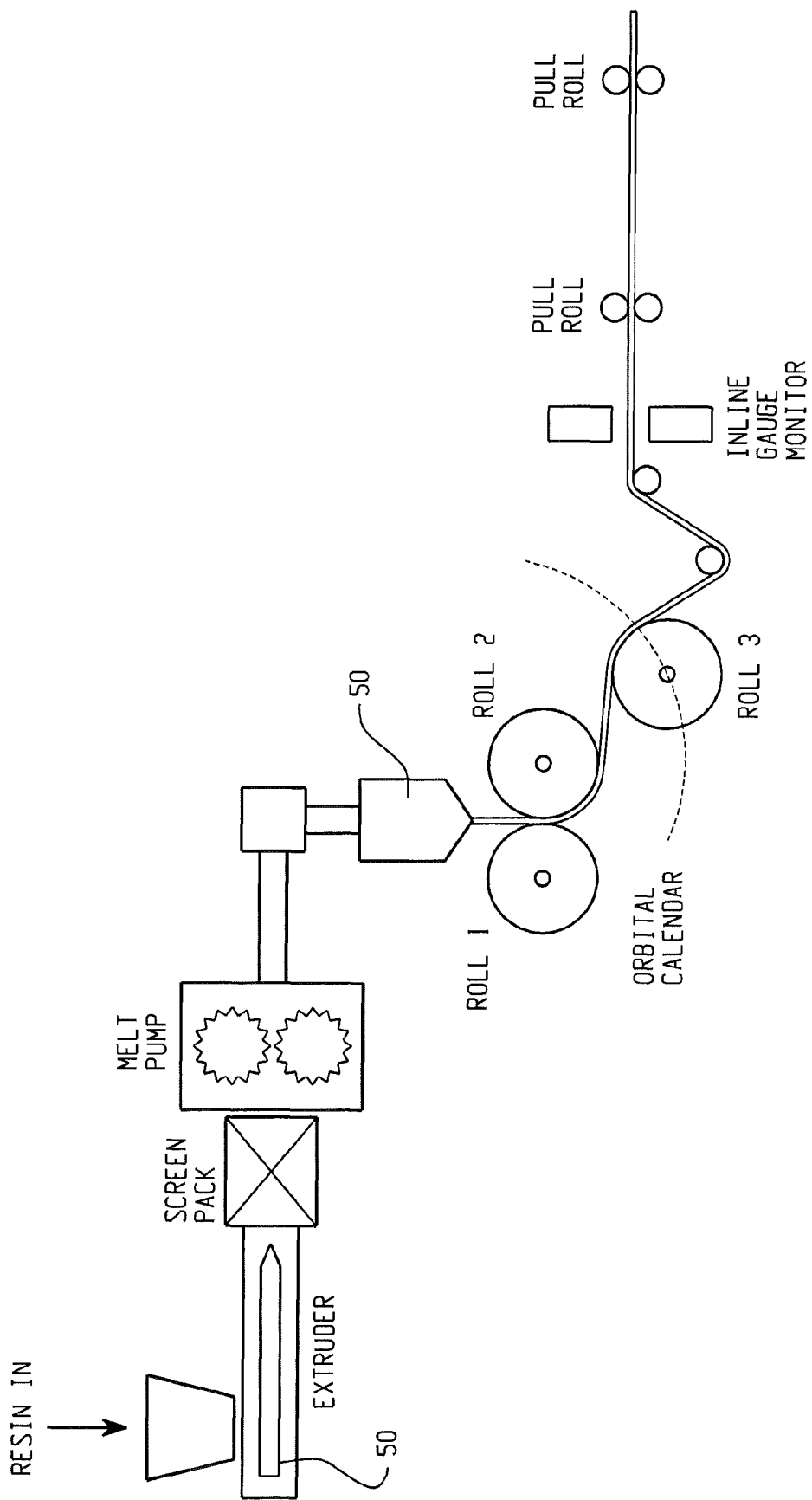
FIG. 13 is a schematic view of an exemplary embodiment of a process for producing the lenticular film.

The various films can be formed using various processes that attain the desired surface characteristics (e.g., polished finish, matte finish, surface features, etc.). Possible processes include extrusion calendaring, micro-replication coating, hot-embossing, injection molding, film calendaring, and so forth. For example, referring to FIG. 13, the material for the particular film can be extruded from extruder 50, through die 52, onto calendaring rolls 54, 56. One or both of the calendaring rolls 54, 56 can have a surface texture with a negative of the desired surface features (e.g., lenticular texture, prisms, etc.). When the cylindrical roller with the surface texture contacts the extruded material, the cylindrical roller forms a surface texture into the surface of the film. The film is then cooled. Depending upon the desired surface texture of the resultant film, the calendaring rolls will comprise a polished metal surface (e.g., to produce a polished surface), an elastomeric surface (e.g., rubber surface to produce a matte finish), or a metal surface with the desired negative of the surface features. The temperatures of the extruder, die, and calendaring rolls, as well as the nip pressure (between the calendaring rolls) and line speed, are dependent upon the specific material used, the melt temperature of the material, and the amount of stress imparted to the film under the particular conditions.

The following examples are merely to further exemplify embodiments of the lenticular film and backlight module, and are not intended to be limiting.

EXAMPLES

Just Noticeable Difference (JND) Visual Hiding Power: Although the Equation I will quantify hiding power, the JND visual inspection on the whole surface will be more proficient to check the systematic hiding power. To do this JND visual inspection, the inspector will wear dark protective glasses, find worst contrast difference from all angles, and apply JND filters in front of dark protective glasses. Then the JND value is given when enough filters applied to not be able to see contrast difference. Finally, the inspector will verify JND value by going over BLM from all angles again with JND filters applied in front of dark glasses. Such a JND visual test can quickly give an indication of hiding power from all view angles, which is very time-consuming with the quantitative measurement. The JND visual inspection provides a score from 5.0 (the worst) to 0.1 (the best), by judging the backlight uniformity from different viewing angles. A lower JND value stands for a better hiding power performance. Typically, the actual backlight system (having a distance between the diffuser plate and the reflector of 20 mm to 5 mm), having the diffuser plate and film stack, will have a JND value of 3.5 to 1.5. Adding a PET-coated diffuser film will improve the hiding power by around 0.4. The JND needed to hide the lamps will vary with different applications. A typical, acceptable value is around 2.0 to 2.3 with a lower JND value being even better and preferred.

Luminance, JND visual hiding power, and viewing angle (Viewing angle test specification according to Video Electronics Standards Association (VESA) Flat Panel Display Measurements Standard (FPDM) 307-2 (Version 2.0, Jun. 1, 2001)). Actual tests (Test 1, Test 2, and Test 3) were performed in two television applications: Eco TV application (32 inch, 12 cold cathode fluorescent lamps (CCFL), backlight module (BLM) with an AB ratio of 0.43), Slim TV application (42 inch, 32 CCFL, BLM with an AB ratio of 0.21). The Eco TV application has a thickness of 20 mm, while the Slim TV application has a thickness of 8 mm.

The first test (Test 1) used three films above a diffuser plate in the Eco TV application, without prism film(s) in the film stack. The diffuser plate was a 2 mm cyclic olefin copolymer ("CoC") (e.g., tradename Zeonor®, commercially available from Zeon Chemicals L.P., Louisville, Ky.) prismatic plate with dispersing particles. The comparisons were done among combinations of a bottom diffuser(s), lenticular films, and two microlens diffusers. The ordering of the films was, from the non-viewing side, diffuser plate, bottom diffuser (BD), Film 2, and then Film 3 which was closest to the viewing side. The bottom diffuser(s) were 0.2 mm-thick monolithic PC film with microlens texture in one side and matte surface in another side. The microlens diffuser U was a 0.2 mm-thick PET based microlens film with acrylic coating, while the microlens diffuser P was a 0.25 mm-thick PET based microlens film with acrylic coating. The lenticular film was a 0.35 mm-thick lenticular PC film with AR of 0.47.

Results show that lenticular film, especially used in horizontal direction (parallel to lamp direction), has the best hiding power performance and much higher luminance than BD. If using two lenticular films in cross direction, it will get the best hiding power performance and comparable luminance to two microlens diffusers stack. The directional lenticular film (horizontal or vertical) will improve the viewing angle in that direction.

Horizontal viewing angle refers to the viewing angle parallel to lamp direction. Vertical viewing angle refers to the viewing angle perpendicular to lamp direction. (Test according to VESA FPDM 307-2.)

TABLE 1

| No. | Film 2 (control film) | Film 3 (control film) | Visual Hiding Power | Relative Lum (%) | Viewing Angle (Hor) | Viewing Angle (Ver) |
|---|---|---|---|---|---|---|
| 1 | BD | BD | 2.1 | 100.0% | 87.9 | 87.9 |
| 2 | BD | Microlens P | 2.0 | 108.9% | 81.8 | 81.4 |
| 3 | BD | Lenticular Film (Hor) | 1.9 | 106.1% | 102.4 | 76.6 |
| 4 | BD | Lenticular Film (Ver) | 2.1 | 105.3% | 76.7 | 102.6 |
| 5 | Microlens U | Microlens U | 2.5 | 110.3% | 81.0 | 80.4 |
| 6 | Microlens P | Microlens P | 2.0 | 114.1% | 77.6 | 77.1 |
| 7 | Lenticular Film (Hor) | Lenticular Film (Ver) | 1.7 | 111.4% | 77.0 | 84.7 |

"Hor" = horizontal, which is parallel to the axis of the bulbs.
"Ver" = vertical, which is perpendicular to the axis of the bulbs.

The second test (Test 2) was performed again using three films above a diffuser plate in the Eco TV. In this test, however, the ordering of the films was, from the non-viewing side, diffuser plate, bottom diffuser (BD), prism film 1, and then Film 3 which was closest to the viewing side. The bottom diffuser (BD) was the same BD as used above. The prism film 1 was 0.25 mm-thick PET-based film coated with 90-degree prismatic texture. The results, set forth in Table 2, illustrate that horizontally placed lenticular film gave the best hiding power performance while the vertically placed lenticular film will give the best luminance performance with rather good hiding power.

TABLE 2

| No. | Film 3 (control film) | Visual Hiding Power | Relative Lum (%) | Viewing Angle (Hor) | Viewing Angle (Ver) |
|---|---|---|---|---|---|
| 8 | BD | 2.0 | 100.0% | 76.5 | 71.7 |
| 9 | Microlens P | 1.9 | 109.9% | 73.5 | 67.2 |
| 10 | Lenticular Film (Hor) | 1.7 | 103.2% | 87.5 | 70.1 |
| 11 | Lenticular Film (Ver) | 1.9 | 115.2% | 71.1 | 63.1 |

The third test was performed using four films above a diffuser plate in the slim TV. In this test the ordering of the films was, from the non-viewing side, diffuser plate, bottom diffuser 1 (BD1, 0.2 mm-thick monolithic PC film with microlens texture in one side and matte surface in the other side), prism film 1 (the same prism in the Test 2), Film 3, and then Film 4 which was closest to the viewing side. The lenticular film is the same one used in last Tests 1 and 2. The results, set forth in Table 3, showed that the lenticular film can get better hiding power and luminance performance than various combinations and compositions of bottom diffusers. It is also noted that if a bottom diffuser is located above (i.e., on the viewing side) instead of below (i.e., on the non-viewing side) the lenticular film, the luminance drops, but the hiding power improvement is maintained.

TABLE 3

| No. | Film 3 (control film) | Film 4 (control film) | Visual Hiding Power | Relative Lum (%) | Viewing Angle (Hor) | Viewing Angle (Ver) |
|---|---|---|---|---|---|---|
| 12 | BD1 | BD2 | 2.6 | 100.0% | 81.5 | 81.8 |
| 13 | BD1 | BD3 | 2.6 | 93.5% | 89.2 | 85.3 |
| 14 | BD1 | BD4 | 2.6 | 74.5% | 132.6 | 126.7 |
| 15 | BD1 | Lenticular Film (Hor) | 2.3 | 105.9% | 93.0 | 72.9 |
| 16 | BD4 | BD1 | 2.6 | 86.0% | 94.0 | 93.4 |
| 17 | Lenticular Film (Hor) | BD1 | 2.3 | 100.7% | 78.0 | 75.7 |

"BD2": 0.35 mm-thick monolithic PC film with microlens texture in one side and matte surface in another side.
"BD3": 0.3 wt % Tospearl ® 120-loaded 0.38 mm-thick monolithic PC film with microlens texture in one side and matte surface in another side.
"BD4": 0.8 wt % Tospearl ® 120-loaded 0.35 mm-thick monolithic PC film with microlens texture in one side and matte surface in another side.
Tospearl ® 120 = Polymethylsilsesquioxane beads commercially available from Momentive Performance Materials, Albany, NY.

Figure 14:
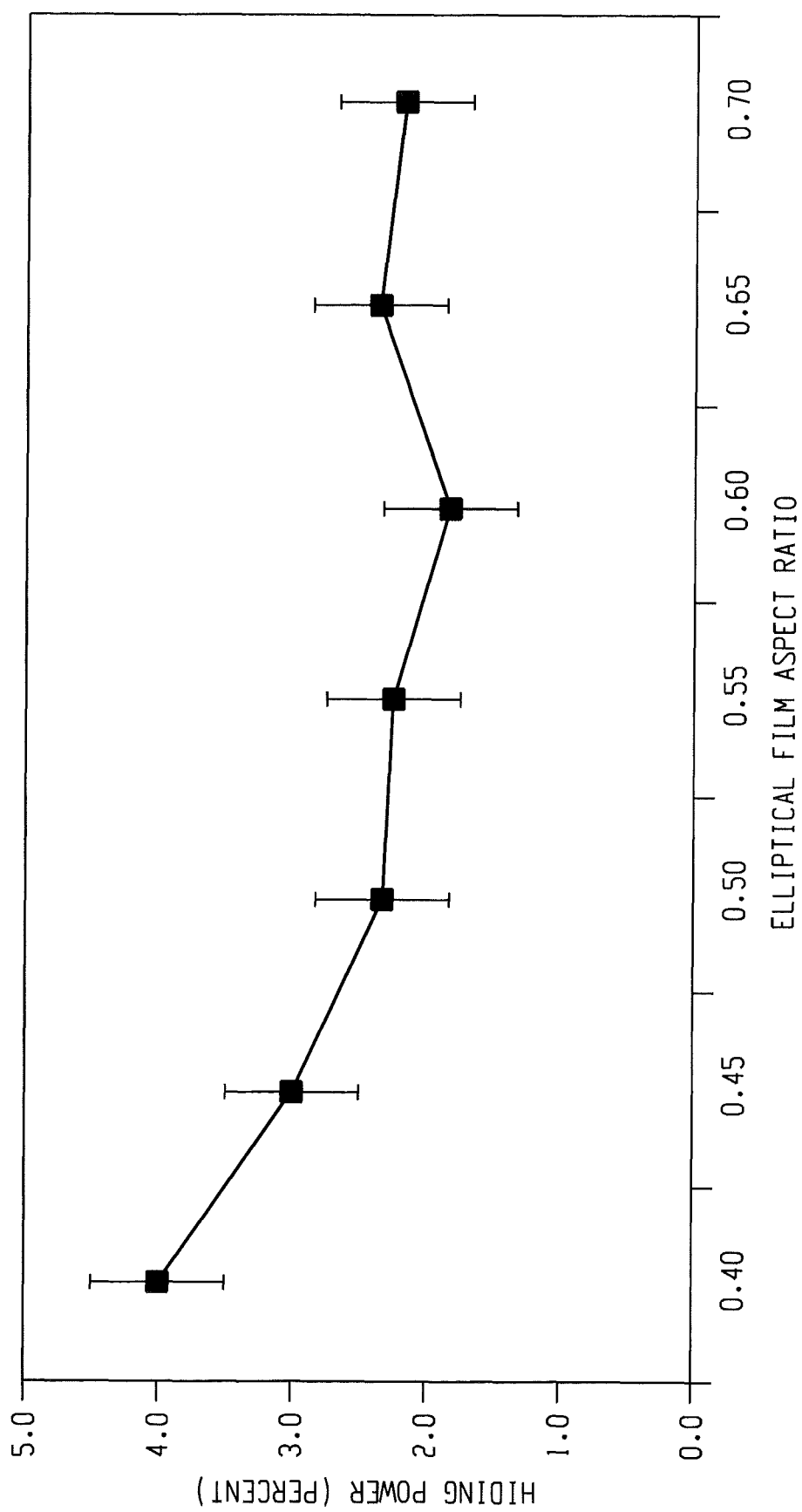
FIG. 14 is a graphical representation of hiding power versus aspect ratio.

The last test (Test 4) was performed using the simulation software, LightTools (commercially available from Optical Research Associates, Pasadena, Calif.) to see the further improvement on hiding power performance if the aspect ratio (AR) is increased to 0.5, 0.6, and to 0.7. FIG. 14 graphically provides the result of the hiding power variation versus the aspect ratio of the lenticular film, which was simulated in another slim TV application (thickness of 10 mm, AB ratio of 0.25) with film stack of a 2 mm CoC diffuser plate (e.g., Zeonor®) a 0.2 mm PC bottom diffuser, and then a 0.2 mm PC lenticular film with horizontal direction. The hiding power is defined using the Equation I. As is illustrated in the figure, the hiding power is enhanced at an aspect ratio of 0.55 to 0.65, with an aspect ratio of 0.58 to 0.63 being particularly advantageous. As can be seen from the above examples the use of the lenticular film(s) in a backlight module unexpectedly attains improved hiding power while maintaining or improving luminance. As a result of this discovery, slim backlight modules, e.g. having a thickness of less than 20 mm, and even less than or equal to 8 mm, can be formed, even with an AB ratio of less than or equal to 0.21, wherein the light sources are not visible through the backlight module (e.g., that have a JND visual hiding power of less than or equal to 2.3). Unless specifically specified otherwise, "visible" as used herein refers to visible to the unaided eye having normal vision.

As discussed herein, a backlight module can comprise: a backlight source, a diffuser plate adjacent the backlight source (e.g., on a side of the backlight source opposite a reflector), and a lenticular film having a convex lenticular feature on a viewing side. The diffuser plate can be located between the lenticular film and the backlight source. The backlight module can: (i) have an AB ratio of less than or equal to 0.5, specifically, less than or equal to 0.4, more specifically, 0.15 to 0.3; (ii) have a distance from a reflector to the diffuser plate of less than or equal to 15 mm, specifically, less than or equal to 10 mm, more specifically, less than or equal to 8 mm; (iii) comprise a collimating film located between the diffuser plate and the lenticular film; (iv) comprise a diffuser film between the diffuser plate and the lenticular film; (v) comprise a first diffuser film and a second diffuser film, wherein the lenticular film is therebetween, and wherein the second diffuser film is between the lenticular film and the diffuser plate, and a collimating film located between the lenticular film and the second diffuser film; (vi) comprise a liquid crystal display, wherein the first diffuser film is between the liquid crystal display and the lenticular film; (vii) a JND of less than or equal to 2.3; and/or (viii) when the backlight source is cold cathode fluorescent lamps, the distance from the reflector to the diffuser plate is 8 mm, and the AB ratio is 0.21, and with two 0.2 mm polycarbonate diffusers and a 0.25 mm PTE coated prismatic film, the cold cathode fluorescent lamps are not visible through the backlight module. Alternatively or in addition, (i) the lenticular film can comprise no diffusing particles; (ii) the diffuser plate can comprise no diffusing particles; (iii) the collimating film can comprise a plurality of geometric microstructures selected from the group consisting of prisms, crossing prismatic shape, pyramidal shapes, corner cube shapes, and combinations comprising at least one of the forgoing; (iv) the non-viewing surface of the lenticular film can be a polished surface or a matte surface; (v) the lenticular features can have an aspect ratio of 0.05 to 1.0; (vi) the lenticular film can be oriented such that the lenticular texture is parallel to an axis of the backlight source, and the module can optionally further comprise a vertical lenticular film oriented perpendicular to the axis; and/or (vii) the lenticular film can be oriented such that the lenticular texture is parallel to an axis of the backlight source. In some embodiments, a lenticular film can comprise convex, lenticular features on the viewing side of the film. The film can have an aspect ratio of 0.4 to 1.0. In some embodiments, when the film is used in a backlight module having cold cathode fluorescent lamps, a thickness of 8 mm, and a AB ratio of 0.21, with two 0.2 mm polycarbonate bottom diffusers, a 0.25 mm PTE coated prismatic film, and a CoC diffuser plate: (i) the cold cathode fluorescent lamps are not visible through the backlight module; and/or (ii) the backlight module can have a Just Noticeable Difference in visual hiding power of less than or equal to 2.3. In various embodiments of this film, (i) the film can be without (i.e., have no) diffusing particles; (ii) the non-viewing surface of the lenticular film can have a polished surface; and/or (iii) the non-viewing surface of the lenticular film is a matte surface.

Ranges disclosed herein are inclusive and combinable (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments. As used herein, the term "(meth)acrylate" encompasses both acrylate and methacrylate groups.

While the embodiments has been described with reference to exemplary embodiments, it will be understood by those skilled in the art that various changes may be made and equivalents may be substituted for elements thereof without departing from the scope of the concept of the embodiments. In addition, many modifications may be made to adapt a particular situation or material to the teachings of the embodiments without departing from essential scope thereof. Therefore, it is intended that the scope not be limited to the particular embodiment disclosed as the best mode contemplated for carrying out this the claims, but that the scope will include all embodiments falling within the appended claims.

What is claimed is:

1. A backlight module, comprising:
   backlight sources;
   a diffuser plate adjacent the backlight source on a side of the backlight sources opposite a reflector; and
   a lenticular film having convex lenticular features on a viewing side, wherein the diffuser plate is located between the lenticular film and the backlight sources;
   wherein the backlight module has a distance "a" between the backlight sources and the diffuser plate, and has a distance "b" between adjacent backlight sources, and has an AB ratio of "a" divided by "b" of less than or equal to 0.5;
   wherein, when the backlight source is cold cathode fluorescent lamps, a CoC diffuser plate, a distance between a reflector and the CoC diffuser plate of 8 mm, and a AB ratio of 0.21, with two 0.2 mm polycarbonate bottom diffusers, and a 0.25 mm PET coated prismatic film, the cold cathode fluorescent lamps are not visible through the backlight module; and wherein the AB ratio is "a" divided by "b", "a" is the distance between the cold cathode fluorescent lamps and the diffuser plate, and "b" is the distance between adjacent cold cathode fluorescent lamps.

2. The backlight module of claim 1, wherein the backlight module has a Just Noticeable Difference in visual hiding power of less than or equal to 2.3.

3. The backlight module of claim 1, wherein the AB ratio is less than or equal to 0.4.

4. The backlight module of claim 1, wherein a distance from a reflector to the diffuser plate is less than or equal to 15 mm.

5. The backlight module of claim 1, wherein the diffuser plate has a thickness of less than or equal to 10 mm.

6. The backlight module of claim 1, wherein the lenticular film has no diffusing particles.

7. The backlight module of claim 1, wherein the diffuser plate comprises no diffusing particles.

8. The backlight module of claim 1, further comprising a collimating film located between the diffuser plate and the lenticular film.

9. The backlight module of claim 1, wherein a non viewing surface of the lenticular film is a polished surface.

10. The backlight module of claim 1, wherein a non viewing surface of the lenticular film is a matte surface.

11. The backlight module of claim 1, wherein the lenticular feature has an aspect ratio of 0.05 to 1.0.

12. The backlight module of claim 1, further comprising a diffuser film between the diffuser plate and the lenticular film.

13. The backlight module of claim 1, further comprising
   a first diffuser film and a second diffuser film, wherein the lenticular film is therebetween, and wherein the second diffuser film is between the lenticular film and the diffuser plate; and
   a collimating film located between the lenticular film and the second diffuser film.

14. The backlight module of claim 13, further comprising a liquid crystal display, wherein the first diffuser film is between the liquid crystal display and the lenticular film.

15. The backlight module of claim 13, wherein the lenticular film is oriented such that the lenticular texture is parallel to an axis of the backlight sources, and further comprising a vertical lenticular film oriented perpendicular to the axis.

16. The backlight module of claim 1, wherein the lenticular film is oriented such that the lenticular texture is parallel to an axis of the backlight sources.

17. A lenticular film, comprising:
  convex, lenticular features on a viewing side of the film, wherein the film has an aspect ratio of 0.4 to 1.0,
  wherein, when used in a backlight module having cold cathode fluorescent lamps, a CoC diffuser plate, a distance between a reflector and the CoC diffuser plate of 8 mm, and a AB ratio of 0.21, with two 0.2 mm polycarbonate bottom diffusers, and a 0.25 mm PET coated prismatic film, the cold cathode fluorescent lamps are not visible through the backlight module; and wherein the AB ratio is "a" divided by "b", "a" is the distance between the cold cathode fluorescent lamps and the diffuser plate, and "b" is the distance between adjacent cold cathode fluorescent lamps.

18. The film of claim 17, wherein the backlight module has a Just Noticeable Difference in visual hiding power of less than or equal to 2.3.

19. The film of claim 17, wherein the film has no diffusing particles.

20. The film of claim 17, wherein a non-viewing surface of the lenticular film is a polished surface.

21. The film of claim 17, wherein a non-viewing surface of the lenticular film is a matte surface.

* * * * *